Nov. 7, 1950     D. P. BERNHEIM     2,529,068
EYE PROTECTION DEVICE
Filed Oct. 18, 1945
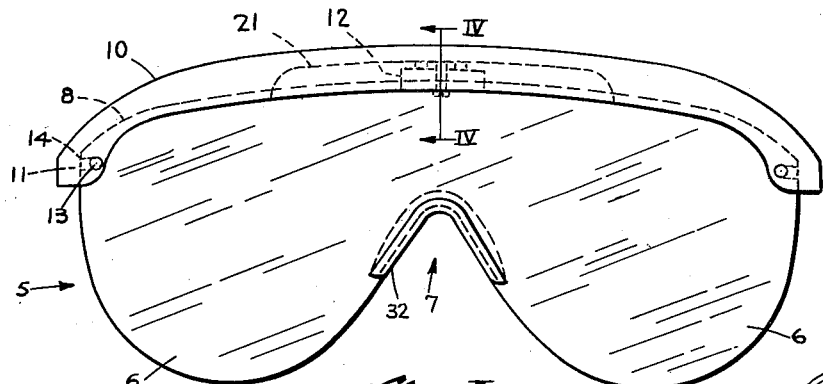
Fig. I
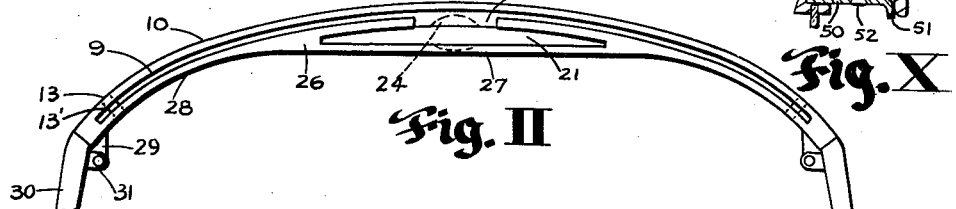
Fig. II
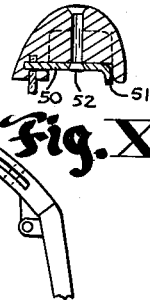
Fig. X
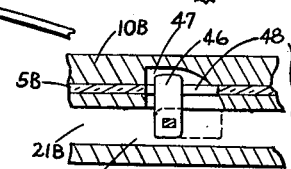
Fig. III
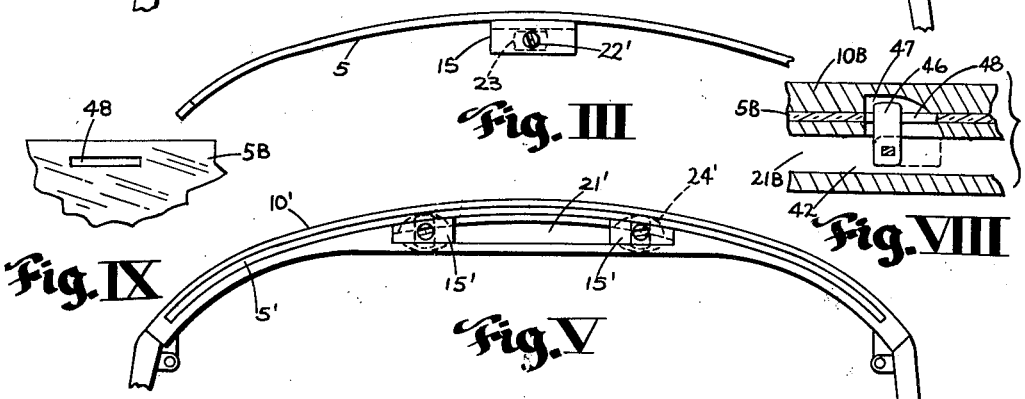
Fig. IX     Fig. V     Fig. VIII
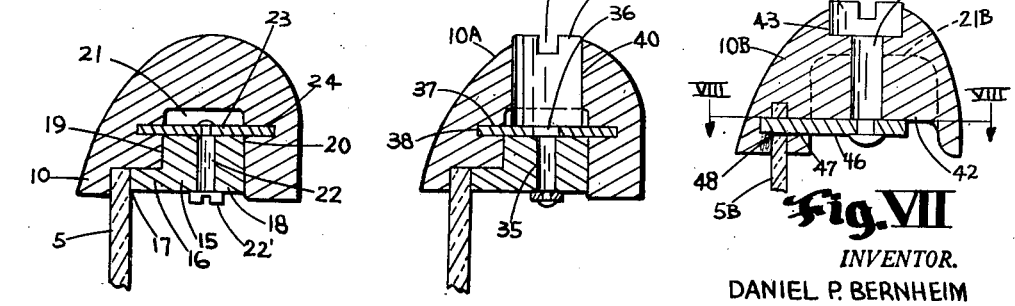
Fig. IV     Fig. VI     Fig. VII
INVENTOR.
DANIEL P. BERNHEIM
BY Louis L. Gagnon
ATTORNEY Patented Nov. 7, 1950

2,529,068

UNITED STATES PATENT OFFICE 2,529,068

EYE PROTECTION DEVICE

Daniel P. Bernheim, Southbridge, Mass., assignor to American Optical Company, Southbridge, Mass., a voluntary association of Massachusetts Application October 18, 1945, Serial No. 623,063

4 Claims. (Cl. 88—41)

This invention relates to improvements in ophthalmic devices and more especially in eye protection devices, and has particular reference to a device embodying a supporting bar and detachable transparent shield or lens for protecting the eyes of the wearer from flying particles or the like and which transparent shield or lens may have embodied therein means for varying and controlling the light transmitted thereby. This invention is an improvement over that disclosed by copending application No. 568,282, filed December 15, 1944, now Patent 2,472,731, June 7, 1949, and entitled Ophthalmic Mountings.

One of the principal objects of the invention is to provide a device of the above character which is light in weight, durable and which has its parts for firmly but readily detachably securing the shield or lens in operative position located above the useful field of vision of the wearer.

Another object is to provide a device of the above character having a detachable shield or lens portion which may be formed of initially flat sheet plastic material defining two interconnected lens sections supported by a reinforcing bar curved to conform substantially to the contour or curvature of the face of the wearer and being of sufficient rigidity to retain the detachable shield or lens substantially to its curvature when said bar and shield or lens are in assembled relation with each other.

Another object of the invention is to provide a device of the above character having a reinforcing bar curved to conform substantially to the curvature of the face of the wearer and a shield or lens portion formed of sheet plastic material defining two lens sections and being detachably supported by said bar by suitable securing means permanently carried by the device and conveniently operated so that the shield may be easily replaced by another shield or lens portion of different light transmitting properties when desired or replaced by a similar shield or lens when the original has become scratched, broken or otherwise damaged.

Another object is to provide a shield or lens and supporting bar therefor of the above character to which temples may be connected and having an intermediate thickened portion functioning as brow engagement means for retaining the shield or lens properly spaced relative to the eyes of the wearer.

Another object is to provide a shield or lens, formed of sheet plastic material defining two interconnected lens portions or sections and having a nasal recess in the lower edge thereof, in combination with a brow engagement and reinforcing bar and a nose engagement member, both of which are readily detachably from the shield or lens, the reinforcing bar having grooved and channelled portions therein adapted to receive and house adjacent edge portions of the lens and operable parts of the securing means so as to readily detachably secure said lens or shield in a proper position for use.

Another object is to provide a reinforcing bar of the above character having a recess and groove therein and extending longitudinally thereof and adapted to receive adjacent edge portions of the shield or lens and the securing means so as to substantially completely conceal said means from view when the device is in place before the eyes of the wearer.

Another object is to provide a brow engagement bar or brace bar of the above character having a recessed portion formed therein for reducing the weight of the bar and for detachably receiving the operable parts of the securing means for the shield.

Another object of the invention is to provide readily operable securing means permanently secured to and carried by the brow engaging bar or the shield or lens in such a way as to easily and readily detachably secure same together without requiring the use of special tools, special equipment or extra small parts, which might be difficult to handle or easily lost while one lens is being replaced by another.

Other objects and advantages of the invention will become apparent from the following description taken in connection with the accompanying drawings, and it will be apparent that many changes may be made in the details of construction and arrangement of parts without departing from the spirit of the invention as expressed in the accompanying claims. The invention therefore is not to be limited to the exact details of construction and arrangement of parts shown and described as the preferred form only has been given by way of illustration.

Referring to the drawings:

Fig. 1 is a front elevational view of the device embodying the invention;

Fig. 2 is a bottom view of the device of Fig. 1, but with the lens and nose engagement members removed therefrom;

Fig. 3 is a bottom view of the lens means of Fig. 1;

Fig. 4 is an enlarged sectional view taken on line 4—4 of Fig. 1 and looking in the direction of the arrows;

Fig. 5 is a bottom view of a modified form of the device of the invention;

Fig. 6 is an enlarged sectional view, similar to Fig. 4 but showing a modified form of securing means;

Fig. 7 is an enlarged sectional view showing another form of securing means;

Fig. 8 is a sectional view taken on line 8—8 of Fig. 7;

Fig. 9 is a view of a portion of the shield or lens of Figs. 7 and 8; and

Fig. 10 is a sectional view, somewhat reduced in size, showing an additional form of securing means.

Referring more particularly to the drawings wherein like characters of reference designate like parts throughout the several views, the device embodying the invention comprises a shield or lens 5 formed from a sheet of transparent material shaped to provide a pair of integral shield or lens sections 6 and a nasal recess 7 in the lower edge thereof, as best shown in Fig. 1. The said integral shield or lens sections 6 are preferably blanked from sheet plastic material, such as cellulose acetate, methyl methacrylate, or any other known transparent artificial resinous materials or may be formed of sheet plastic material sold under the trade name "Polaroid" and may have any desired light absorbing characteristics or color obtained by using proper light absorbing dyes incorporated within the plastics or artificial resinous material or by incorporating therein means for absorbing rays in the extra visual regions.

The shield or lens 5 is provided with an upper curved edge 8 adapted to fit within a relatively narrow elongated slot or recessed seat 9 formed longitudinally of a reinforcing bar or support 10. The bar or support 10 may be formed of any suitable material, preferably moldable plastic material, such as for example, cellulose acetate, methyl methacrylate or other known artificial resinous materials or may be formed of cellulose nitrate or the like, depending upon the nature of the material used for the shield or lens portion. The shield or lens 5, as shown by Fig. 1, is removably secured within the longitudinal slot, or attachment seat 9 by means of detachable connections or securing means 11 located near the opposite ends of the bar 10 and by a readily operable securing or attaching means 12 intermediate the ends of the bar. If desired the end connections 11 may be omitted and only the intermediate operable connection 12 relied upon to maintain the shield or lens 5 in proper position. However, the perferred construction would include both end and intermediate connections since a somewhat more rigid device is produced thereby.

Each securing means 11 comprises a relatively fixed or integral pin or lug 13 arranged preferably to extend transversely through an end portion of the bar 10, traversing the slot 9 to thus provide an intermediate bearing portion 13' for engagement by a perforation or slot 14 formed in the lateral or end edge portion of the shield 5. The connection 12 is preferably formed, as clearly shown by Figs. 2, 3 and 4, by the provision of a block 15 cemented or otherwise secured along the front surface of the portion 16 to the rear upper central edge portion of the lens or shield 5, as indicated at 17. A portion 18 of the block 15 rearwardly of the portion 16 is made somewhat thicker and provided with front and rear walls or surfaces 19 and 20 arranged to fit within the central portion of a channel or recess 21 formed in the bar 10 with the surfaces 19 and 20 preferably closely adjacent the front and rear walls of the recess so as to be supported thereby when the block is locked in position in the recess. A hole is formed or drilled vertically through the rear portion 18 and a pin 22 is arranged therein so that its upper squared end projects beyond the top of the block and through a squared opening or aperture in a latch or locking member 23 and has its end portion peened over so as to secure same and insure movement of the member 23 when the pin 22 is rotated. The pin 22 is provided at its opposite end with a slotted head 22' for the reception of a small screw driver or the like and when rotated is effective in causing the end or ends of the locking member 23 to enter a slot or slots 24 formed in the bar 10, thus locking the block and attached lens portion in place. The bar 10 at its center is provided with a free portion 25 to accommodate the portion 16 of the block 15 extending between the slot 9 and recess 21 when the parts are assembled.

The support or bar 10 has its front surface preferably curved substantially to the contour shape or curvature of the face of the wearer and is provided with an intermediate or central portion 26 of increased thickness for accommodating the recess 21 and providing a rear surface 27 for engaging the brow of the wearer when in position of use, the bar thus being adapted to space the shield or lens sections 6 from the eyes an amount sufficient to clear the eyelashes of the wearer. The recess 21 is also provided for decreasing the weight of the bar. The said support or bar 10 is provided adjacent its opposed ends with portions 28 tapering outwardly from said intermediate portion and terminating in temple lugs 29 preferably formed of the same material as the support or bar 10, either integrally therewith or separately and joined therewith by a suitable cement, solvent or other adhesive. Suitable temples 30 formed in part or entirely of material similar to the support or bar member 10 are secured to the lugs 29 preferably by hinge members 31 either formed of the same material and integrally with the temples 30, or formed separately and of metal, in which instance the said hinge members would be secured to the temples 30 by rivets or the like.

This shield or lens 5, in the vicinity of the nasal recess 7, is provided, as shown in Fig. 1, with a detachable nose engagement member 32 the details of which form no part of this invention. The said nose engagement member is shaped substantially to the contour shape of the nasal recess 7, may be formed of the same materials as set forth for said bar 10 and may be provided with rearwardly extending integral pad portions (not shown) for engaging the opposed sides of the nose of the wearer, it being understood that the said pads are suitably angled for proper and comfortable fit with the nose.

It is particularly pointed out that the shield or lens sections 6 are initially formed of flat sheet material and that when detachably secured within the slot 9 of bar 10, the upper edges of said section are curved to fit within said slot 9 and are retained substantially to said curvature of the slot during the use of the device. The said shield or lens sections may be tinted red, green, or any other desirable color as well as embodying any other absorptive characteristics desired.

While the support or bar member 10 is described as being curved substantially to the contour or curvature of the face, the said curvature is also so controlled as to reduce reflection of light incident on the shield or lens portion from a direction rearwardly of the wearer.

The shield or lens 5 may be cut, blanked, or otherwise shaped to the contour shape desired from sheet material having the proper characteristics required. In instances when the shield or lens portion 6 is formed of relatively thin material it may be merely bent to the curvature of the bar through the securing thereof within the slot 9 with the bar 10 being solely depended upon for retaining the shield or lens to the desired curvature. In instances when the shield or lens is formed of relatively thick material, the said lens is preferably formed and set, as by heat and pressure, substantially to the said curvature and is then inserted within the slot or seat 9. In this latter instance, the bar 10, of course, aids in retaining the shield or lens 5 to said desired curved shape.

When it is desired to assemble the parts of the device of Fig. 1 for use, the upper edge 8 of the shield or lens 5 is flexed to a slightly sharper curvature than it would normally assume when in assembled position so that the opposed lateral or end edge portions of the lens 5 may be inserted into the downwardly extending end portions of the slot 9 in the bar 10 and the slots or perforations 14 at the opposite ends of the shield are then partially engaged over the bearing portions 13' of the pins of lugs 13. The central portion of the upper edge 8 of the shield 5 is then inserted in the slot 9, this being accompanied by a combined sliding and pivoting action of the upper outer slotted corners of the shield 5 in engagement with the slotted ends of the bar 10 as the perforations 14 in the shield slip into engagement with the bearing surfaces 13' and adjacent parts of the edge 8 slide into the slot 9. When the upper edge 8 is completely within the slot 9 and the portions 16 and 18 of the block 15 are seated in the spaces 25 and 21 respectively, the pin 22 and latch 23 may be rotated ninety degrees from the position shown in Fig. 3 to position the ends of the latch 23 in the slots 24 and lock the shield 5 in its normal assembled position relative to the bar 10. It will be apparent that the more or less vertical walls of the recess 21 and free space 25 will be so formed as to allow the block 15 to be moved downwardly freely when the lens 5 is being detached.

A slightly modified form of ophthalmic device is shown in Fig. 5 and embodies a shield or lens portion 5', generally similar to the shield 5 of Fig. 1, but having a pair of blocks 15' carrying locking means adjacent the opposite ends of the channelled or recessed portion 21' of the bar 10' which, like the device of Fig. 1, is provided with slots 24' for the securing means of the shield 5'. By the use of such laterally spaced locking or securing means, it is possible, if desired, to omit the slot and pin connections at the opposite ends of the lens 5' and still provide sufficient rigidity between the reinforcing and supporting bar 10' and the lens 5'. Of course, if preferred, the end slot and pin connections may be employed.

A modified form of securing or locking means is shown in Fig. 6 and may be used in place of the means shown by Fig. 4. It comprises, instead of a pin having a slotted head upon its lower end as shown in Fig. 4, a pin 35 extending through the block 15 and secured therein by a washer or the like engaged by the peened lower end of the pin. The opposite end portion of the pin is provided with an enlarged squared portion 36, engaging a squared aperture in the latch or locking member 37 arranged to have its ends engage in slots 38 in bar 10A, and a still larger cylindrical head portion 39 extending upwardly through a bore 40 in the bar to expose a slot 41 for receiving a small screw driver or the like when it is desired to rotate the latch and replace one lens 5 by another. The slotted head portion 39, thus, may be reached more conveniently than in the construction of Fig. 4.

In the modified form of attaching means shown by Figs. 7, 8 and 9, which likewise may be used in place of the securing means shown by Fig. 4, a small rib 42 is formed across the recessed or channelled portion 21B of the reinforcing bar 10B and provided with a bore 43 to receive a pin 44 and a portion of the head 45 formed thereon. In this construction the pin is permanently but rotatably carried by the reinforcing bar and has secured to its lower end a locking member 46 arranged to pivot into a recess or slot 47 formed in the forward portion of the reinforcing bar 10B and extend through an aligned slot 48 provided in the lens or shield 5B. This construction has the advantage that no cementing step is necessary in the manufacture of the device, as required by the constructions of Figs. 4 and 6, and allows extra lenses or shields 5B to be nested or stacked compactly together when not assembled for use.

The modified construction of Fig. 10 is like Fig. 7 except that a latch 50 is provided with a downwardly bent rear end portion 51 to serve as an operating lug and is held in place by an ordinary pin or rivet 52 extenting through the reinforcing bar.

From the foregoing description it will be seen that simple, efficient, and economical means have been provided for accomplishing all the objects and advantages of the invention.

Having described the invention, I claim:

1. An eye protection device of the character described comprising a relatively rigid bar-like support having a grooved portion extending from adjacent its opposed ends and having a sidewall curved in the direction of the general contour of the face, a transparent shield of flexible material having its upper edge portion seated in said grooved portion and cupped by the curvature of said sidewall of the grooved portion to the general curvature of the face, said upper edge portion of the shield seated within the grooved portion being notched adjacent its opposed ends, and the bar-like support having projections in said grooved portion adjacent the ends for engagement with said notched portions, said shield having an apertured portion adjacent said upper edge portion and in the central region thereof, and latch means carried by the support having a movable part extendable into said apertured portion and withdrawable therefrom, said movable part of the latch and apertured portion of the shield cooperating with the notched portions in the upper edge portion of the shield and the projections adjacent the ends of the support for detachably maintaining the shield in assembled relation with the bar-like support.

2. An eye protection device of the character described comprising a relatively rigid bar-like support having a grooved portion extending from adjacent its opposed ends and having a sidewall curved in the direction of the general contour of the face, a transparent shield of flexible material having its upper edge portion seated in said grooved portion and cupped by the curvature of said sidewall of the grooved portion to the general curvature of the face, said upper edge portion of the shield seated within the grooved portion being notched adjacent its opposed ends and having an apertured portion centrally of said notched portions, pin-like projections carried by the bar-like support in said grooved portion adjacent the ends thereof for engagement with said notched portions, together with rotatable latch means carried by the support having a movable part extendable into said apertured portion and withdrawable therefrom, and operable means for rotating said latch so as to control the position of said movable part thereof, said movable part of the latch and apertured portion of the shield cooperating with the notched portions in the upper edge portion of the shield and pin-like projections for detachably maintaining the shield in assembled relation with the bar-like support.

3. An eye protection device of the character described comprising a relatively rigid bar-like support having a front surface shaped to follow in the direction of the general contour of the face and having brow engagement means on its rear surface, said support having a grooved portion on its underside extending from adjacent the opposed ends of the support and following substantially the shape of the front surface of said support, and a transparent shield of flexible material having its upper edge portion seated in said grooved portion and cupped by the grooved portion to the general curvature of the face, said upper edge portion of the shield seated within the grooved portion being notched adjacent its opposed ends and having an apertured portion centrally of said ends, and projections carried by the bar-like support in said grooved portion adjacent the ends thereof for engagement with said notched portion, together with latch means rotatably mounted on the support and having a part extendable into said apertured portion and withdrawable therefrom by rotation of the latch, said part of the latch and apertured portion of the shield cooperating with the notched portions in the upper edge portion of the shield and adjacent pin-like projections for detachably maintaining the shield in assembled relation with the bar-like support.

4. An eye protection device of the character described comprising a relatively rigid bar-like member having a grooved portion extending throughout the major portion of the length thereof from adjacent its opposed ends, said grooved portion having a side wall curved in the direction of the general contour of the face and having connection means adjacent the opposed ends thereof communicating with said groove, and a shield member of flexible transparent material having its upper edge portion detachably seated in said grooved portion and cupped by the curvature of said side wall of the grooved portion to the general curvature of the face and having connection means adjacent the temporal sides thereof, one of said members having an apertured portion in the central region thereof and the other of said members having latch means carried thereby, said latch means being attached to said member and having a part movable substantially in an arc about said point of attachment into said apertured portion and withdrawable therefrom and said connection means adjacent the opposed ends of the shield and bar-like member embodying interfitting portions which engage with each other when the detachable upper edge portion of the shield member is seated in the groove so as to function cooperatively with said latch means and apertured portion for detachably maintaining the shield member in assembled relation with the bar-like member.

DANIEL P. BERNHEIM.

REFERENCES CITED

The following references are of record in the file of this patent:

UNITED STATES PATENTS

| Number | Name | Date |
| --- | --- | --- |
| 1,238,396 | Elwood | Aug. 28, 1917 |
| 1,310,077 | Heaford | July 15, 1919 |
| 1,596,019 | Nelson | Aug. 17, 1926 |
| 1,772,825 | Costenbader | Aug. 12, 1930 |
| 2,155,693 | Tanasso et al. | Apr. 25, 1939 |
| 2,240,724 | Styll | May 6, 1941 |
| 2,311,991 | Nerney | Feb. 23, 1943 |
| 2,337,617 | Miller | Dec. 28, 1943 |
| 2,360,482 | Evans | Oct. 17, 1944 |
| 2,387,849 | Lehmberg et al. | Oct. 30, 1945 |
| 2,387,851 | Lown et al. | Oct. 30, 1945 |
| 2,397,243 | Cooper | Mar. 26, 1946 |
| 2,444,498 | Cochran | July 6, 1948 |